(12) United States Patent
McGuigan Flook et al.

(10) Patent No.: US 9,994,663 B2
(45) Date of Patent: Jun. 12, 2018

(54) FUNCTIONALIZED ELASTOMER CONTAINING A SULFUR GROUP

(71) Applicant: The Goodyear Tire & Rubber Company, Akron, OH (US)

(72) Inventors: Margaret McGuigan Flook, Kent, OH (US); Inigo Gottker genannt Schnetmann, Constance (DE); Hannes Leicht, Constance (DE); Stefan Mecking, Constance (DE)

(73) Assignee: The Goodyear Tire & Rubber Company, Akron, OH (US)

( * ) Notice: Subject to any disclaimer, the term of this patent is extended or adjusted under 35 U.S.C. 154(b) by 257 days.

(21) Appl. No.: 14/973,772

(22) Filed: Dec. 18, 2015

(65) Prior Publication Data

US 2016/0177010 A1    Jun. 23, 2016

(51) Int. Cl.
| | |
|---|---|
| *C08F 236/06* | (2006.01) |
| *C08F 230/08* | (2006.01) |
| *C08F 236/14* | (2006.01) |
| *B60C 1/00* | (2006.01) |
| *C08F 4/619* | (2006.01) |

(52) U.S. Cl.
CPC .............. *C08F 236/06* (2013.01); *B60C 1/00* (2013.01); *B60C 1/0016* (2013.01); *C08F 230/08* (2013.01); *C08F 236/14* (2013.01); *C08F 4/619* (2013.01); *C08F 4/61908* (2013.01)

(58) Field of Classification Search
CPC ....... B60C 1/00; B60C 1/0016; C08F 230/08; C08F 236/06; C08F 236/14; C08F 4/619; C08F 4/61908
USPC ........................................................ 526/286
See application file for complete search history.

(56) References Cited

U.S. PATENT DOCUMENTS 8,598,286 B1 * 12/2013 Flook ................... C08F 236/10
                                                               526/153

FOREIGN PATENT DOCUMENTS

| GB | 1344839 A | 1/1974 |
|---|---|---|
| GB | 2217705 A | 11/1989 |
| KR | 20110060588 A | 6/2011 |

OTHER PUBLICATIONS

European Search Report dated Feb. 24, 2017 for Application Serial No. EP16202926.

* cited by examiner

*Primary Examiner* — Wenwen Cai
(74) *Attorney, Agent, or Firm* — John D. DeLong

(57) ABSTRACT

The present invention is directed to a copolymer of a monomer selected from the group consisting of 1,3-butadiene and isoprene, and a monomer of formula I

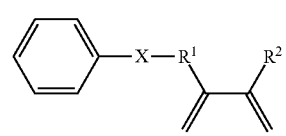

wherein $R^1$ is a covalent bond, phenylene, a linear or branched alkane diyl group containing 1 to 10 carbon atoms, or a combination of one or more phenylene groups and one or more linear or branched alkane diyl groups containing 1 to 10 carbon atoms; and $R^2$ is hydrogen or a linear or branched alkyl group containing 1 to 10 carbon atoms; and X is a sulfur atom or a structure of formula II or III, wherein when X is of formula III, the S atom of formula III is adjacent to the phenyl ring of formula I and the N atom of formula III is adjacent to R1

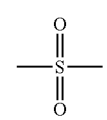

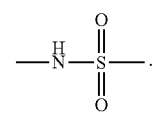

10 Claims, No Drawings

FUNCTIONALIZED ELASTOMER CONTAINING A SULFUR GROUP

BACKGROUND

Stereoregular diene polymers are produced and used industrially on a large scale as an important component of tire compounds. Diene polymers with high levels of stereoregularity are almost exclusively prepared with coordination polymerization catalysts, which are in general easily poisoned by polar functionalities. Because of this poisoning effect, the types of monomers that are compatible with coordination catalysts are usually limited to simple hydrocarbons. It is well known within the tire industry that the incorporation of even low levels of functionality into certain tire polymers (prepared through anionic or emulsion polymerization) significantly improves the performance of tires containing such polymers. Unfortunately, there is currently no reliable method to apply this functionalization technology to stereoregular diene polymers, but it is likely that such a polymer would show superior tire properties over known unfunctionalized polymers.

WO2004/007602 discloses a catalyst for the polymerization of 1,4-dienes, styrene and for the copolymerization of two monomers. The characteristics of the inventive catalyst include a high degree of stereoselectivity, catalytic activity and tolerance to the presence of polar impurities. Said catalyst combines the characteristics specific to Ni-based diene polymerization catalysts (high stereoselectivity and catalytic activity) with a well-defined character and tolerance to the presence of polar substances.

O'Connor et al. (*Journal of Applied Polymer Science, Part A: Polymer Chemistry*, Vol. 48, 1901-1912 (2010)) disclose polymerization of 2,3 bis(4-trifluoroethoxy-4-oxobutyl)-1,3-butadiene catalyzed by a cationic ally (Ni)II complex. Attempts to polymerize the monomer with the ester groups replaced by more basic amino and hydroxy functional groups were unsuccessful.

U.S. Pat. Nos. 6,100,373; 6,344,538; and 6,583,260 disclose functionalized diene monomers and polymers containing functionalized dienes and methods for their preparation.

SUMMARY

The present invention is directed to a copolymer of 1,3-butadiene or isoprene and a monomer of formula I

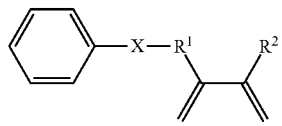

wherein $R^1$ is a covalent bond, phenylene, a linear or branched alkane diyl group containing 1 to 10 carbon atoms, or a combination of one or more phenylene groups and one or more linear or branched alkane diyl groups containing 1 to 10 carbon atoms; and $R^2$ is hydrogen or a linear or branched alkyl group containing 1 to 10 carbon atoms; and X is a sulfur atom or a structure of formula II or III, wherein when X is of formula III, the S atom of formula III is adjacent to the phenyl ring of formula I and the N atom of formula III is adjacent to R1.

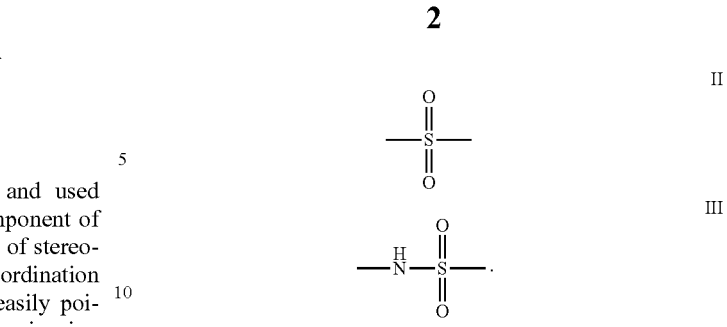

The invention is further directed to a rubber composition including the copolymer, and a pneumatic tire containing the rubber composition.

The invention is further directed to a method of making such a copolymer.

DESCRIPTION

There is disclosed a copolymer of 1,3-butadiene or isoprene and a monomer of formula I

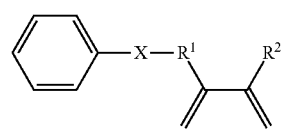

wherein $R^1$ is a covalent bond, phenylene, a linear or branched alkane diyl group containing 1 to 10 carbon atoms, or a combination of one or more phenylene groups and one or more linear or branched alkane diyl groups containing 1 to 10 carbon atoms; and $R^2$ is hydrogen or a linear or branched alkyl group containing 1 to 10 carbon atoms; and X is a sulfur atom or a structure of formula II or III, wherein when X is of formula III, the S atom of formula III is adjacent to the phenyl ring of formula I and the N atom of formula III is adjacent to R1.

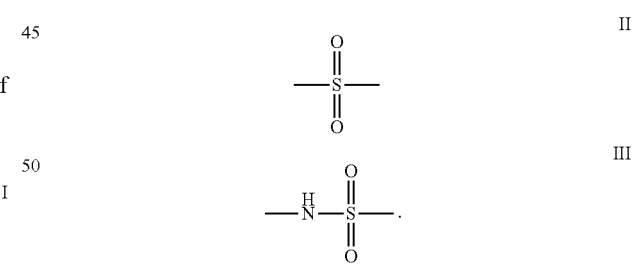

There is further disclosed a rubber composition including the copolymer, and a pneumatic tire containing the rubber composition.

There is further disclosed a method of making such a copolymer.

The copolymer is produced via polymerization of a nonfunctionalized diene monomer and a functionalized diene monomer.

In one embodiment, the nonfunctionalized diene monomer is 1,3-butadiene or isoprene.

In one embodiment, the functionalized diene monomer is a monomer of formula I

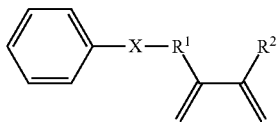

I wherein $R^1$ is phenylene, or a linear or branched alkane diyl group containing 1 to 10 carbon atoms, or a combination of one or more phenylene groups and one or more linear or branched alkane diyl groups containing 1 to 10 carbon atoms; and $R^2$ is hydrogen or a linear or branched alkyl group containing 1 to 10 carbon atoms; and X is a sulfur atom or a structure of formula II or III, wherein when X is of formula III, the S atom of formula III is adjacent to the phenyl ring of formula I and the N atom of formula III is adjacent to R1

II

III

In one embodiment, the nonfunctionalized monomer is selected from 1,3-butadiene and isoprene.

The copolymer has a high degree of stereoregularity. In one embodiment, the copolymer has a cis 1,4 microstructure content of greater than 80 percent by weight based on the polybutadiene content of the copolymer. In one embodiment, the copolymer has a cis 1,4 microstructure content of greater than 95 percent by weight based on the polybutadiene content of the copolymer.

The copolymer has a major weight portion attributed to units derived from the nonfunctionalized monomer, and a minor weight portion attributed to units derived from the functionalized monomer. In one embodiment, the copolymer comprises from 0.1 to 40 percent by weight of units derived from the functionalized diene monomer. In one embodiment, the copolymer comprises from 0.5 to 20 percent by weight of units derived from the functionalized diene monomer. In one embodiment, the copolymer comprises from 1 to 5 percent by weight of units derived from the functionalized diene monomer.

The copolymer is produced by polymerization of the nonfunctionalized monomer and functionalized monomer in the presence of a nickel coordination catalyst. In one embodiment, the catalyst is an (allyl)(arene)Ni(II) compound. Suitable (allyl)(arene)Ni(II) compounds may be produced as described in O'Connor et al. (*Organometallics* 2009, 28 2372-2384). The catalyst is generally in the form of a cation with a suitable counteranion. In one embodiment, the counteranion is tetrakis(3,5-bis(tifluoromethyl)phenyl) borate (i.e. $BAr^F_4{}^-$). In one embodiment, the catalyst is the (allyl)(mesitylene)Ni(II)$^+$ $BAr^F_4{}^-$ complex as shown in formula IV

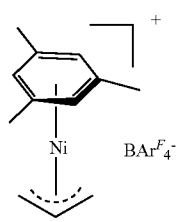

IV

The polymerization using the (allyl)(arene)Ni(II) catalysts may be done following the methods as described in O'Connor et al. (*Journal of Applied Polymer Science, Part A: Polymer Chemistry*, Vol. 48, 1901-1912 (2010)). The copolymerization may be carried out by solution polymerization at a temperature ranging from 0 to 60 C. Suitable solvents for the solution polymerization include toluene, methylene chloride, and heptane, and the like.

The copolymer may be compounded into a rubber composition.

The rubber composition may optionally include, in addition to the functionalized copolymer, one or more rubbers or elastomers containing olefinic unsaturation. The phrases "rubber or elastomer containing olefinic unsaturation" or "diene based elastomer" are intended to include both natural rubber and its various raw and reclaim forms as well as various synthetic rubbers. In the description of this invention, the terms "rubber" and "elastomer" may be used interchangeably, unless otherwise prescribed. The terms "rubber composition," "compounded rubber" and "rubber compound" are used interchangeably to refer to rubber which has been blended or mixed with various ingredients and materials and such terms are well known to those having skill in the rubber mixing or rubber compounding art. Representative synthetic polymers are the homopolymerization products of butadiene and its homologues and derivatives, for example, methylbutadiene, dimethylbutadiene and pentadiene as well as copolymers such as those formed from butadiene or its homologues or derivatives with other unsaturated monomers. Among the latter are acetylenes, for example, vinyl acetylene; olefins, for example, isobutylene, which copolymerizes with isoprene to form butyl rubber; vinyl compounds, for example, acrylic acid, acrylonitrile (which polymerize with butadiene to form NBR), methacrylic acid and styrene, the latter compound polymerizing with butadiene to form SBR, as well as vinyl esters and various unsaturated aldehydes, ketones and ethers, e.g., acrolein, methyl isopropenyl ketone and vinylethyl ether. Specific examples of synthetic rubbers include neoprene (polychloroprene), polybutadiene (including cis-1,4-polybutadiene), polyisoprene (including cis-1,4-polyisoprene), butyl rubber, halobutyl rubber such as chlorobutyl rubber or bromobutyl rubber, styrene/isoprene/butadiene rubber, copolymers of 1,3-butadiene or isoprene with monomers such as styrene, acrylonitrile and methyl methacrylate, as well as ethylene/propylene terpolymers, also known as ethylene/propylene/diene monomer (EPDM), and in particular, ethylene/propylene/dicyclopentadiene terpolymers. Additional examples of rubbers which may be used include alkoxy-silyl end functionalized solution polymerized polymers (SBR, PBR, IBR and SIBR), silicon-coupled and tin-coupled star-branched polymers. The preferred rubber or elastomers are polyisoprene (natural or synthetic), polybutadiene and SBR.

In one aspect the at least one additional rubber is preferably of at least two of diene based rubbers. For example, a combination of two or more rubbers is preferred such as cis 1,4-polyisoprene rubber (natural or synthetic, although natural is preferred), 3,4-polyisoprene rubber, styrene/isoprene/butadiene rubber, emulsion and solution polymerization derived styrene/butadiene rubbers, cis 1,4-polybutadiene rubbers and emulsion polymerization prepared butadiene/acrylonitrile copolymers.

In one aspect of this invention, an emulsion polymerization derived styrene/butadiene (E-SBR) might be used having a relatively conventional styrene content of about 20 to about 28 percent bound styrene or, for some applications, an E-SBR having a medium to relatively high bound styrene content, namely, a bound styrene content of about 30 to about 45 percent.

By emulsion polymerization prepared E-SBR, it is meant that styrene and 1,3-butadiene are copolymerized as an aqueous emulsion. Such are well known to those skilled in such art. The bound styrene content can vary, for example, from about 5 to about 50 percent. In one aspect, the E-SBR may also contain acrylonitrile to form a terpolymer rubber, as E-SBAR, in amounts, for example, of about 2 to about 30 weight percent bound acrylonitrile in the terpolymer.

Emulsion polymerization prepared styrene/butadiene/acrylonitrile copolymer rubbers containing about 2 to about 40 weight percent bound acrylonitrile in the copolymer are also contemplated as diene based rubbers for use in this invention.

The solution polymerization prepared SBR (S-SBR) typically has a bound styrene content in a range of about 5 to about 50, preferably about 9 to about 36, percent. The S-SBR can be conveniently prepared, for example, by organo lithium catalyzation in the presence of an organic hydrocarbon solvent.

In one embodiment, cis 1,4-polybutadiene rubber (BR) may be used. Such BR can be prepared, for example, by organic solution polymerization of 1,3-butadiene. The BR may be conveniently characterized, for example, by having at least a 90 percent cis 1,4-content.

The cis 1,4-polyisoprene and cis 1,4-polyisoprene natural rubber are well known to those having skill in the rubber art.

The term "phr" as used herein, and according to conventional practice, refers to "parts by weight of a respective material per 100 parts by weight of rubber, or elastomer."

The rubber composition may also include up to 70 phr of processing oil. Processing oil may be included in the rubber composition as extending oil typically used to extend elastomers. Processing oil may also be included in the rubber composition by addition of the oil directly during rubber compounding. The processing oil used may include both extending oil present in the elastomers, and process oil added during compounding. Suitable process oils include various oils as are known in the art, including aromatic, paraffinic, naphthenic, vegetable oils, and low PCA oils, such as MES, TDAE, SRAE and heavy naphthenic oils. Suitable low PCA oils include those having a polycyclic aromatic content of less than 3 percent by weight as determined by the IP346 method. Procedures for the IP346 method may be found in *Standard Methods for Analysis & Testing of Petroleum and Related Products* and *British Standard* 2000 *Parts,* 2003, 62nd edition, published by the Institute of Petroleum, United Kingdom.

The rubber composition may include silica, carbon black, or a combination of silica and carbon black.

The rubber composition may include from about 1 to about 150 phr of silica. In another embodiment, from 10 to 100 phr of silica may be used.

The commonly employed siliceous pigments which may be used in the rubber compound include conventional pyrogenic and precipitated siliceous pigments (silica). In one embodiment, precipitated silica is used. The conventional siliceous pigments employed in this invention are precipitated silicas such as, for example, those obtained by the acidification of a soluble silicate, e.g., sodium silicate.

Such conventional silicas might be characterized, for example, by having a BET surface area, as measured using nitrogen gas. In one embodiment, the BET surface area may be in the range of about 40 to about 600 square meters per gram. In another embodiment, the BET surface area may be in a range of about 80 to about 300 square meters per gram. The BET method of measuring surface area is described in the *Journal of the American Chemical Society*, Volume 60, Page 304 (1930).

The conventional silica may also be characterized by having a dibutylphthalate (DBP) absorption value in a range of about 100 to about 400, alternatively about 150 to about 300.

The conventional silica might be expected to have an average ultimate particle size, for example, in the range of 0.01 to 0.05 micron as determined by the electron microscope, although the silica particles may be even smaller, or possibly larger, in size.

Various commercially available silicas may be used, such as, only for example herein, and without limitation, silicas commercially available from PPG Industries under the Hi-Sil trademark with designations 210, 243, etc.; silicas available from Rhodia, with, for example, designations of Z1165MP and Z165GR and silicas available from Degussa AG with, for example, designations VN2 and VN3, etc.

Commonly employed carbon blacks can be used as a conventional filler in combination with silica in an amount ranging from 1 to 150 phr. In another embodiment, from 10 to 100 phr of carbon black may be used. Although carbon black may be used with silica, in one embodiment, essentially no carbon black is used except for an amount required to impart black color to the tire which is from 1 to 10 phr. Representative examples of such carbon blacks include N110, N121, N134, N220, N231, N234, N242, N293, N299, N315, N326, N330, N332, N339, N343, N347, N351, N358, N375, N539, N550, N582, N630, N642, N650, N683, N754, N762, N765, N774, N787, N907, N908, N990 and N991. These carbon blacks have iodine absorptions ranging from 9 to 145 g/kg and DBP number ranging from 34 to 150 cm$^3$/100 g.

Combinations of silica and carbon black may be used in the composition. In one embodiment, the weight ratio of silica to carbon black is greater than or equal to one.

Other fillers may be used in the rubber composition including, but not limited to, particulate fillers including ultra high molecular weight polyethylene (UHMWPE), crosslinked particulate polymer gels including but not limited to those disclosed in U.S. Pat. Nos. 6,242,534; 6,207, 757; 6,133,364; 6,372,857; 5,395,891; or 6,127,488, and plasticized starch composite filler including but not limited to that disclosed in U.S. Pat. No. 5,672,639. Such other fillers may be used in an amount ranging from 1 to 30 phr.

In one embodiment the rubber composition may contain a conventional sulfur containing organosilicon compound. In one embodiment, the sulfur containing organosilicon compounds are the 3,3'-bis(trimethoxy or triethoxy silylpropyl) polysulfides. In one embodiment, the sulfur containing organosilicon compounds are 3,3'-bis(triethoxysilylpropyl) disulfide and/or 3,3'-bis(triethoxysilylpropyl) tetrasulfide.

In another embodiment, suitable sulfur containing organosilicon compounds include compounds disclosed in U.S. Pat. No. 6,608,125. In one embodiment, the sulfur containing organosilicon compounds includes 3-(octanoyl-thio)-1-propyltriethoxysilane, $CH_3(CH_2)_6C(=O)-S-CH_2CH_2CH_2Si(OCH_2CH_3)_3$, which is available commercially as NXT™ from Momentive Performance Materials.

In another embodiment, suitable sulfur containing organosilicon compounds include those disclosed in U.S. Patent Publication No. 2003/0130535. In one embodiment, the sulfur containing organosilicon compound is Si-363 from Degussa.

The amount of the sulfur containing organosilicon compound in a rubber composition will vary depending on the level of other additives that are used. Generally speaking, the amount of the compound will range from 0.5 to 20 phr. In one embodiment, the amount will range from 1 to 10 phr.

It is readily understood by those having skill in the art that the rubber composition would be compounded by methods generally known in the rubber compounding art, such as mixing the various sulfur-vulcanizable constituent rubbers with various commonly used additive materials such as, for example, sulfur donors, curing aids, such as activators and retarders and processing additives, such as oils, resins including tackifying resins and plasticizers, fillers, pigments, fatty acid, zinc oxide, waxes, antioxidants and antiozonants and peptizing agents. As known to those skilled in the art, depending on the intended use of the sulfur vulcanizable and sulfur-vulcanized material (rubbers), the additives mentioned above are selected and commonly used in conventional amounts. Representative examples of sulfur donors include elemental sulfur (free sulfur), an amine disulfide, polymeric polysulfide and sulfur olefin adducts. In one embodiment, the sulfur-vulcanizing agent is elemental sulfur. The sulfur-vulcanizing agent may be used in an amount ranging from 0.5 to 8 phr, alternatively with a range of from 1.5 to 6 phr. Typical amounts of tackifier resins, if used, comprise about 0.5 to about 10 phr, usually about 1 to about 5 phr. Typical amounts of processing aids comprise about 1 to about 50 phr. Typical amounts of antioxidants comprise about 1 to about 5 phr. Representative antioxidants may be, for example, diphenyl-p-phenylenediamine and others, such as, for example, those disclosed in *The Vanderbilt Rubber Handbook* (1978), Pages 344 through 346. Typical amounts of antiozonants comprise about 1 to 5 phr. Typical amounts of fatty acids, if used, which can include stearic acid comprise about 0.5 to about 3 phr. Typical amounts of zinc oxide comprise about 2 to about 5 phr. Typical amounts of waxes comprise about 1 to about 5 phr. Often microcrystalline waxes are used. Typical amounts of peptizers comprise about 0.1 to about 1 phr. Typical peptizers may be, for example, pentachlorothiophenol and dibenzamidodiphenyl disulfide.

Accelerators are used to control the time and/or temperature required for vulcanization and to improve the properties of the vulcanizate. In one embodiment, a single accelerator system may be used, i.e., primary accelerator. The primary accelerator(s) may be used in total amounts ranging from about 0.5 to about 4, alternatively about 0.8 to about 1.5, phr. In another embodiment, combinations of a primary and a secondary accelerator might be used with the secondary accelerator being used in smaller amounts, such as from about 0.05 to about 3 phr, in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are amines, disulfides, guanidines, thioureas, thiazoles, thiurams, sulfenamides, dithiocarbamates and xanthates. In one embodiment, the primary accelerator is a sulfenamide. If a second accelerator is used, the secondary accelerator may be a guanidine, dithiocarbamate or thiuram compound.

The mixing of the rubber composition can be accomplished by methods known to those having skill in the rubber mixing art. For example, the ingredients are typically mixed in at least two stages, namely, at least one non-productive stage followed by a productive mix stage. The final curatives including sulfur-vulcanizing agents are typically mixed in the final stage which is conventionally called the "productive" mix stage in which the mixing typically occurs at a temperature, or ultimate temperature, lower than the mix temperature(s) than the preceding non-productive mix stage(s). The terms "non-productive" and "productive" mix stages are well known to those having skill in the rubber mixing art. The rubber composition may be subjected to a thermomechanical mixing step. The thermomechanical mixing step generally comprises a mechanical working in a mixer or extruder for a period of time suitable in order to produce a rubber temperature between 140° C. and 190° C. The appropriate duration of the thermomechanical working varies as a function of the operating conditions, and the volume and nature of the components. For example, the thermomechanical working may be from 1 to 20 minutes.

The rubber composition may be incorporated in a variety of rubber components of the tire. For example, the rubber component may be a tread (including tread cap and tread base), sidewall, apex, chafer, sidewall insert, wirecoat or innerliner. In one embodiment, the component is a tread.

The pneumatic tire of the present invention may be a race tire, passenger tire, aircraft tire, agricultural, earthmover, off-the-road, truck tire, and the like. In one embodiment, the tire is a passenger or truck tire. The tire may also be a radial or bias.

Vulcanization of the pneumatic tire of the present invention is generally carried out at conventional temperatures ranging from about 100° C. to 200° C. In one embodiment, the vulcanization is conducted at temperatures ranging from about 110° C. to 180° C. Any of the usual vulcanization processes may be used such as heating in a press or mold, heating with superheated steam or hot air. Such tires can be built, shaped, molded and cured by various methods which are known and will be readily apparent to those having skill in such art.

This invention is illustrated by the following examples that are merely for the purpose of illustration and are not to be regarded as limiting the scope of the invention or the manner in which it can be practiced. Unless specifically indicated otherwise, parts and percentages are given by weight.

Example 1

Synthesis of the Ni catalyst IV is described in literature (O'Connor et al. *Organometallics* 2009, 28 2372-2384). Alternatively, a mixture of this complex with Mg-salts and excess NaBAr$^F_4$ can be generated by following the outlined procedure of example 2.

Example 2

In this example, the synthesis of a Ni(II) coordination catalyst is illustrated. The compound of formula III was converted to the compound of formula II as follows. Compound III (8 mmol) was combined with NaBAr$^F_4$ (8 mmol) and mesitylene (20 mmol) in 40 ml of diethyl ether in a 100 ml Schlenk tube and cooled −78 C. After 5 minutes, 8 ml of 1 M allyl magnesium bromide in diethyl ether was dropwise added under stirring, and the temperature increased to −20 C by exchange of the cooling bath after the addition of allyl magnesium bromide was complete. After 60 minutes at −20 C, the cooling bath was removed and the mixture warmed to 25 C at which the ether was distilled off at 25 C to leave a crude solid. Methylene chloride (30 ml) was then added and the mixture was agitated, followed by filtration of the solids. Heptane (10 mL) was added to the methylene chloride solution and the resulting mixture concentrated to dryness under high vacuum to leave 6.85 g of solids containing about 50% yield of the catalyst IV based on Ni.

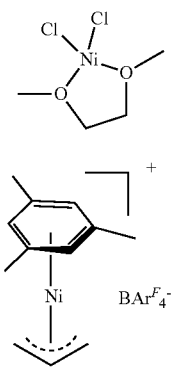

Example 3

In the following example, the copolymerization of 1,3 butadiene with (3-methylbuta-1,3-dien-2-yl)(phenyl)sulfane (formula VI) is illustrated.

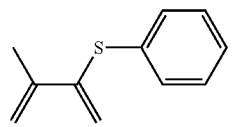

(3-methylbuta-1,3-dien-2-yl)(phenyl)sulfane

The functional monomer (3-methylbuta-1,3-dien-2-yl)(phenyl)sulfane was synthesized following methods as described in Baeckvall, J.-E.; Ericsson, A. *J. Org. Chem.* 1994, 59, 5850-5851.

Example 4

In this example, the copolymerization of 1,3 butadiene with the monomer of formula VI is illustrated. Polymerizations were done to produce three copolymer samples, as indicated in Table 1.

The functional monomer of formula VI was synthesized as described in Example 3.

Sample 1 and 2 were synthesized as follows:

The monomer of formula VI was added to a flame-dried schlenk-flask as toluene solution (total volume of toluene 15 mL) and the flask was subsequently sealed with a rubber septum. Butadiene was added by saturation of the toluene at the reaction temperature with 1.05 bar BD pressure. The polymerization was initiated by adding the catalyst in toluene (5 mL) at the indicated reaction temperature. The polymerization was allowed to run at that temperature for the indicated time. 0.5 mL of NEt$_3$ were added to end the polymerization. Residual butadiene was carefully removed under reduced pressure and the polymer was precipitated in MeOH in the presence of BHT (ca. 100 mg/100 mL). The formed polymer was dried overnight at 50° C. under reduced pressure to give the indicated yield g of poly(butadiene-co-(3-methylbuta-1,3-dien-2-yl)(phenyl)sulfane). Samples were analyzed with results given in Table 1. Molecular weight Mn and polydispersity (PDI) were measured using GPC in THF vs. polystyrene standards. Glass transition temperature Tg was measured using DSC. The microstructure of the polymer was determined by NMR-analyses ($^1$H and $^{13}$C).

Sample 3 was synthesized as follows:

A solution of the monomer of formula VI in 30 mL of toluene was added to a 200 mL Büchi ecoclave pressure reactor (glassware, up to 6 bar) equipped with a mechanical stirrer, a pressure burette and a thermostat. Under stirring, the reactor was evacuated until the toluene begun to boil, then butadiene (ca. 50 mL) was condensed into the reactor until a constant pressure of 1.2 bar was reached. The reactor was heated to 38° C. (i.e. 2° C. below the desired reaction temperature) while stirring the content at 750 rpm. Then, a solution of 10 μmol of catalyst II in 5 mL toluene was injected into the reactor via the pressure burette. The onset of the polymerization was evident by a 2-5° C. exotherm after injection of a second aliquot (10 μmol in 5 mL toluene) of the catalyst. After 4 h polymerization time a solution of 0.5 mL triethylamine in 5 mL toluene was injected into the reactor through the pressure burette, the reactor was cooled to 25° C., and excess butadiene was carefully removed under vacuum. The polymer was precipitated in MeOH in the presence of BHT (ca. 100 mg/100 mL). The formed polymer was dried overnight at 50° C. under reduced pressure to give the indicated yield g of poly(butadiene-co-(3-methylbuta-1, 3-dien-2-yl)(phenyl)sulfane). Samples were analyzed with results given in Table 1. Molecular weight Mn and polydispersity (PDI) were measured using GPC in THF vs. polystyrene standards. Glass transition temperature Tg was measured using DSC. The microstructure of the polymer was determined by NMR-analyses ($^1$H and $^{13}$C).

TABLE 1

| Sample No. | 1 | 2 | 3 |
|---|---|---|---|
| amount of catalyst[1], μmol | 10 | 10 | 10 + 10 |
| temperature, ° C. | r.t. | 50 | 40 |
| time, h | 1.25 | 3.5 | 4 |
| butadiene, bar | 1.05 | 1.05 | 50 mL |
| comonomer of formula VI, mmol | 0.1 | 0.2 | 0.61 |
| yield, g | 3.1 | 1.8 | 7.9 |
| comonomer incorporation, mol % | 0.05 | 0.26 | 0.07 |
| comonomer conversion, % | 29 | 44 | 17 |
| $M_n$, 10$^3$ g/mol | 69 | 25 | 76 |
| PDI | 2.3 | 2.1 | 2.1 |
| $T_g$, ° C. | −97 | n.d. | n.d. |
| Microstructure, %1,4-cis | 96 | 94 | 97 |

[1]Catalyst was added in two aliquots in samples 1 and 3 as indicated

Example 5

In the following example, the copolymerization of 1,3 butadiene with (5-methyl-4-methylenehex-5-en-1-yl)(phenyl)sulfane (formula VII) is illustrated.

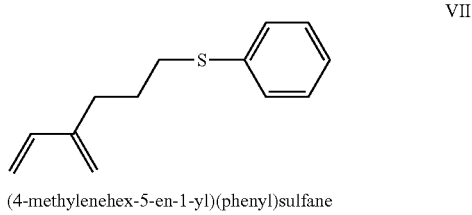

(4-methylenehex-5-en-1-yl)(phenyl)sulfane

The functional monomer (5-methyl-4-methylenehex-5-en-1-yl)(phenyl)sulfane was synthesized as follows:

Synthesis of (4-methylenehex-5-en-1-yl)(phenyl)sulfane

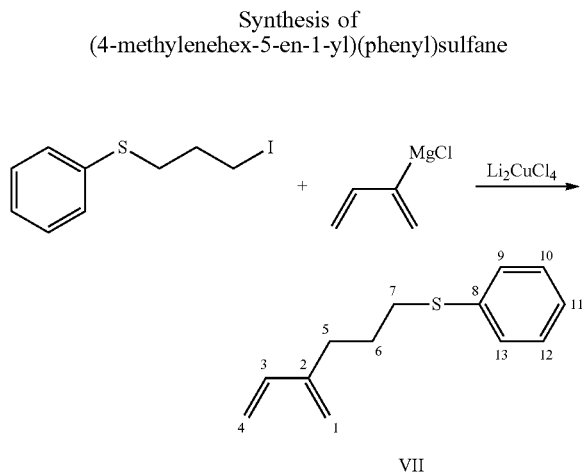

((3-iodopropyl)thio)-benzene (0.7 g, 2.5 mmol, may be synthesized according to Tetrahedron (1998), 54, (40), 12361-12378) was cooled to −20° C., Li$_2$CuCl$_4$ (0.01 equiv, 21.2 mg LiCl+33.6 mg CuCl$_2$) in 5 mL THF was added. Chloroprene-Grignard solution (2.75 mmol, 1.1 equiv in 2 mL THF, synthesized according to Journal of Applied Polymer Science (2005), Vol. 97, 1545-1552.) was added dropwise. The solvent was removed under reduced pressure after stirring for 30 min and warming to room temperature. Column chromatography (PE/EtOAc 20:1) gave the desired compound as yellowish oil.

yield: 342.2 mg (1.68 mmol, 67%)

$^1$H-NMR (400 MHz, C$_6$D$_6$): δ=7.28-7.25 (m, 2H, H9 and 13), 7.02-6.99 (m, 2H, H10 and 12), 6.93-6.90 (m, 1H, H11), 6.25 (dd, $^3$J=10.8, 17.6 Hz, 1H, H3), 5.08 (d, J=17.6 Hz, 1H, H4), 4.91 (d, $^3$J=10.8 Hz, 1H, H4), 4.89 (s, 1H, H1), 4.83 (s, 1H, H1), 2.67 (t, $^3$J=7.2 Hz, 2H, H7), 2.27 (t, $^3$J=7.2 Hz, 2H, H5), 1.80 (vquint, J=7.2 Hz, 2H, H6).

$^{13}$C-NMR (101 MHz, C$_6$D$_6$): δ=145.6 (C2), 138.9 (C3), 137.5 (C8), 129.3 (C9 and C13), 129.1 (C10 and C12), 125.8 (C11), 116.4 (C1), 113.5 (C4), 33.3 (C7), 30.5 (C5), 27.8 (C6).

Example 6

In this example, the copolymerization of 1,3 butadiene with the monomer of formula VII is illustrated. Polymerizations were done to produce a copolymer sample, as indicated in Table 2.

The functional monomer of formula VII was synthesized as described in Example 5.

A solution of the monomer of formula VII in 30 mL of toluene was added to a 200 mL Büchi ecoclave pressure reactor (glassware, up to 6 bar) equipped with a mechanical stirrer, a pressure burette and a thermostat. Under stirring, the reactor was evacuated until the toluene begun to boil, then butadiene (ca. 50 mL) was condensed into the reactor until a constant pressure of 1.2 bar was reached. The reactor was heated to 38° C. (i.e. 2° C. below the desired reaction temperature) while stirring the content at 750 rpm. Then, a solution of 10 µmol of catalyst II in 5 mL toluene was injected into the reactor via the pressure burette. The onset of the polymerization was evident by a 2-5° C. exotherm after injection of a second aliquot (10 µmol in 5 mL toluene) of the catalyst. After 2 h polymerization time a solution of 0.5 mL triethylamine in 5 mL toluene was injected into the reactor through the pressure burette, the reactor was cooled to 25° C., and excess butadiene was carefully removed under vacuum. The polymer was precipitated in MeOH in the presence of BHT (ca. 100 mg/100 mL). The formed polymer was dried overnight at 50° C. under reduced pressure to give the indicated yield g of poly(butadiene-co-(5-methyl-4-methylenehex-5-en-1-yl)(phenyl)sulfane). Samples were analyzed with results given in Table 2. Molecular weight Mn and polydispersity (PDI) were measured using GPC in THF vs. polystyrene standards. Glass transition temperature Tg was measured using DSC. The microstructure of the polymer was determined by NMR-analyses ($^1$H and $^{13}$C).

TABLE 2

| Sample No. | 4 |
| --- | --- |
| amount of catalyst[1], µmol | 10 + 10 |
| temperature, ° C. | 40 |
| time, h | 2 |
| butadiene, bar | 50 ml |
| comonomer of formula VII, mmol | 0.5 |
| yield, g | 31.2 |
| comonomer incorporation, mol % | below detection limit |
| comonomer conversion, % | below detection limit |
| M$_n$, 10$^3$ g/mol | 44 |
| PDI | 6.4 |
| T$_g$, ° C. | — |
| Microstructure, %1,4-cis | 96 |

[1]Catalyst was added in two aliquots in sample 4 as indicated

Example 7

In the following example, the copolymerization of 1,3 butadiene ((4-methylenehex-5-en-1-yl)sulfonyl)benzene (formula VIII) is illustrated.

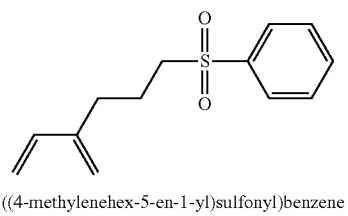

((4-methylenehex-5-en-1-yl)sulfonyl)benzene

The functional monomer ((4-methylenehex-5-en-1-yl)sulfonyl)benzene was synthesized as follows:

(a) Synthesis of ((3-iodopropyl)sulfonyl)benzene

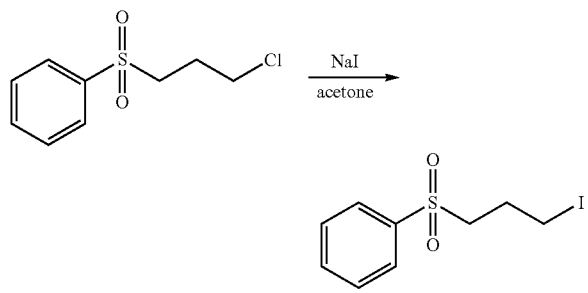

((3-chloropropyl)sulfonyl)-benzene (4.37 g, 20 mmol, 1 equiv, synthesized according to Bioorganic & Medicinal Chemistry (2004), 12, (10), 2737-2747) was dissolved in acetone (50 mL) and NaI (6.00 g, 40 mmol, 2 equiv) was added. The reaction mixture was refluxed for 12 h. The solvent was removed under reduce pressure, $Et_2O$ (100 mL) was added and the mixture was extracted with $H_2O$ (3×50 mL). The organic phase was dried over $Na_2SO_4$ and the solvent removed under reduced pressure to give crude ((3-iodopropyl)sulfonyl)benzene which was used in the next step without further purification.

(b) Synthesis of ((4-methylenehex-5-en-1-yl)sulfonyl)benzene

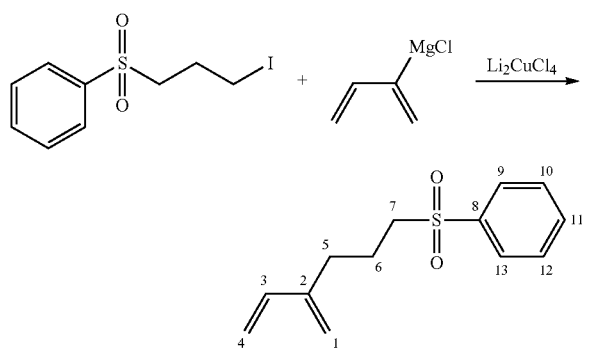

((3-iodopropyl)sulfonyl)benzene (930 mg, 3 mmol) was cooled to −20° C., $Li_2CuCl_4$ (0.01 equiv) in 5 mL THF was added. Chloroprene-Grignard solution (3.3 mmol, 1.1 equiv in 2 mL THF) was added dropwise. The solvent was removed under reduced pressure after stirring for 30 min and warming to room temperature. Column chromatography (PE/EtOAc 20:1) gave the desired compound as yellowish oil.

yield: 627 mg (2.6 mmol, 88%)

$^1$H-NMR (400 MHz, $CDCl_3$): δ=7.89-7.87 (m, 2H, H9 and 13), 7.63-7.60 (m, 1H, H11), 7.56-7.52 (m, 2H, H10 and H12), 6.27 (dd, $^3J$=17.6, 10.8 Hz, 1H, H3), 5.11 (d, $^3J$=17.6 Hz, 1H, H4), 5.01 (d, J=11.2 Hz, 1H, H4), 5.00 (s, 1H, H1), 4.91 (s, 1H, H1), 3.08 (m, 2H, H7), 2.27 (t, J=7.6 Hz, 2H, H5), 1.92 (m, 2H, H6).

$^{13}$C-NMR (101 MHz, $CDCl_3$): δ=144.0 (C2), 139.1 (C8), 137.9 (C3), 133.5 (C11), 129.2 (C10 and C12), 127.9 (C9 and C13), 116.7 (C1), 113.7 (C4), 55.5 (C7), 29.6 (C5), 21.0 (C6).

Example 8

In this example, the copolymerization of 1,3 butadiene with the monomer of formula VIII is illustrated. Polymerizations were done to produce two copolymer samples, as indicated in Table 3.

The functional monomer of formula VIII was synthesized as described in Example 7.

The monomer of formula VIII was added to a flame-dried schlenk-flask as toluene solution (total volume of toluene 15 mL for example 5, and 35 mL for example 6) and the flask was subsequently sealed with a rubber septum. Butadiene was added by saturation of the toluene at the reaction temperature with 1.05 bar BD pressure. The polymerization was initiated by adding the catalyst in toluene (5 mL) at the indicated reaction temperature. The polymerization was allowed to run at that temperature for the indicated time. 0.5 mL of $NEt_3$ were added to end the polymerization. Residual butadiene was carefully removed under reduced pressure and the polymer was precipitated in MeOH in the presence of BHT (ca. 100 mg/100 mL). The formed polymer was dried overnight at 50° C. under reduced pressure to give the indicated yield g of poly(butadiene-co-((4-methylenehex-5-en-1-yl)sulfonyl)benzene). Samples were analyzed with results given in Table 3. Molecular weight Mn and polydispersity (PDI) were measured using GPC in THF vs. polystyrene standards. Glass transition temperature Tg was measured using DSC. The microstructure of the polymer was determined by NMR-analyses ($^1$H and $^{13}$C).

TABLE 3

| Sample No. | 5 | 6 |
| --- | --- | --- |
| amount of catalyst, μmol | 10 | 6 + 4 + 5 |
| temperature, ° C. | r.t. | 0 |
| time, h | 0.5 | 4 |
| butadiene, bar | 1.05 | 1.05 |
| comonomer of formula VIII, mmol | 0.5 | 0.46 |
| yield, g | 4.5 | 3.9 |
| comonomer incorporation, mol % | 0.24 | 0.13 |
| comonomer conversion, % | 40 | 21 |
| $M_n$, $10^3$ g/mol | 44 | 89 |
| PDI | 2.4 | 1.9 |
| $T_g$, ° C. | −94 | −97 |
| Microstructure, %1,4-cis | 96 | 97 |

Example 9

In the following example, the copolymerization of 1,3 butadiene with N-(5-methyl-4-methylenehex-5-en-1-yl)benzenesulfonamide (formula IX) is illustrated.

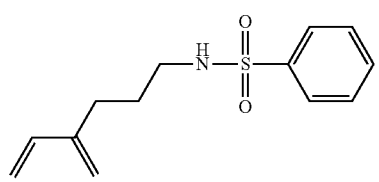

N-(4-methylenehex-5-en-1-yl)benzenesulfonamide

The functional monomer N-(4-methylenehex-5-en-1-yl)benzenesulfonamide was synthesized as follows:

Synthesis of (4-methylene-5-hexenyl)-(bis(trimethylsilyl)-amine

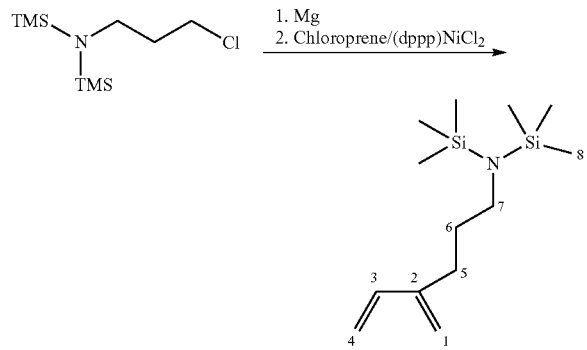

(a) 2.25 g (92.5 mmol, 1.5 equiv.) Mg turnings were layered with THF and 0.36 mL dibromoethane (0.79 g, 4.2 mmol) were added to activate the magnesium. A mixture of 15.0 g of 3-chloropropyl-bis(trimethylsilyl)amine (63.1 mmol, 1 equiv., synthesized according to Rekken, B. D.; Carre-Burritt, A. E.; Scott, B. L.; Davis, B. L. *Journal of Materials Chemistry A* 2014, 2, 16507-16515.) and 0.36 mL (0.79 g, 4.2 mmol) of dibromoethane in 63 mL of THF were added dropwise and the reaction mixture was stirred for 2 h at 60° C. Residual magnesium was filtered off, and the clear solution was used in the next step.

(b) 0.252 g (0.50 mmol) of (dppp)NiCl$_2$ and 5.9 g (66.2 mmol, 1.05 equiv.) of chloroprene were dissolved in 21 mL of THF. The reaction mixture was cooled to 0° C. and after the dropwise addition of (3-(bis(trimethylsilyl)amino)propyl)magnesium chloride solution obtained under (a) the mixture was stirred for 10 minutes at 0° C. and afterwards for 40 minutes at room temperature. The reaction mixture was treated with 100 mL of heptane and THF was removed under reduced pressure. The resulting brown suspension was filtered over celite and the solvent was removed under reduced pressure. The crude product was purified by distillation (73° C./3.3·10$^{-1}$ mbar) to yield 12.27 g (76.2%) of (4-methylene-5-hexenyl)-(bis(trimethylsilyl)-amine as a colorless liquid.

$^1$H-NMR (400 MHz, C$_6$D$_6$, 300 K) δ [ppm]=6.31 (dd, $^3$J=17.6 and 11.2 Hz 1H, H3), 5.17 (d, $^3$J=17.6 Hz, 1H, H4), 4.97 (d, $^3$J=11.2 Hz, 1H, H4), 4.93 (s, 2H, H1), 2.78 (m, 2H, H7), 2.06 (t, $^3$J=7.6 Hz, 2H, H5), 1.59 (m, 2H, H6), 0.13 (s, 18H, H8).

$^{13}$C-NMR (100 MHz, C$_6$D$_6$, 300 K) δ [ppm]=146.3 (C2), 139.2 (C3), 116.1 (C1), 113.4 (C4), 45.9 (C7), 34.1 (C5), 29.4 (C6), 2.3 (C8).

Synthesis of (4-methylene-5-hexenyl)-amine

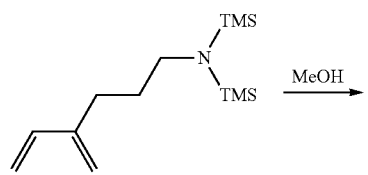

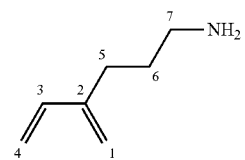

(4-methylene-5-hexenyl)-(bis(trimethylsilyl)amine (1.95 g, 7.64 mmol) was dissolved in 20 mL methanol and stirred at reflux for 2 h. Solvent and methoxy-trimethylsilan was removed under reduced pressure and the crude product was used without further purification.

yield: 0.34 g (3.1 mmol, 40%) NMR data is given for an in situ deprotection in presence of methanol-d$_4$, therefore the NH$_2$ signal is not observed.

$^1$H-NMR (400 MHz, CDCl$_3$): δ=6.28 (dd, $^3$J=17.6 and 10.8 Hz, 1H, H3), 5.16 (d, J=17.6 Hz, 1H, H4), 4.97 (d, $^3$J=10.9 Hz, 1H, H4), 4.93 (s, 1H, H1), 4.91 (s, 1H, H1), 2.63 (t, J=7.3 Hz, 2H, H7), 2.16 (t, J=7.7 Hz, 2H, H5), 1.57 (p, J=7.4 Hz, 2H, H6).

Synthesis of (4-methylene-5-hexenyl)-phenylsulfonic amide

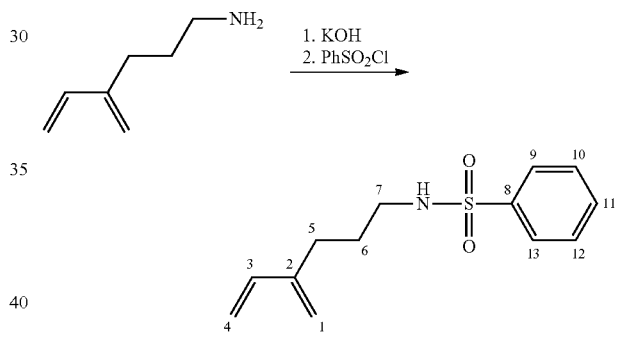

IX

Synthesis in analogy to Dong, X.; Sang, R.; Wang, Q.; Tang, X.-Y.; Shi, M. *Chem.-Eur. J.* 2013, 19, 16910-16915. (4-methylene-5-hexenyl)-amine (1.5 g, 13.5 mmol, 1 equiv) and potassium hydroxide (1.5 g, 27 mmol, 2 equiv) were stirred in water. Benzenesulfonyl chloride (2.38 g, 13.5 mmol, 1 equiv) in 10 mL CH$_2$Cl$_2$ and added. The mixture was stirred for 1 h at r.t. and the aqueous phase was extracted with CH$_2$Cl$_2$ (3×50 mL). The combined organic layers were dried over Na$_2$SO$_4$ and the solvent was removed under reduced pressure. Column chromatography (PE/EtOAc 20:1) gave a colourless oil.

yield: 2.14 g (8.5 mmol, 63%).

$^1$H-NMR (400 MHz, CD$_2$Cl$_2$): δ=, 7.86 (m, 2H, H9 and H13), 7.60 (m, 1H, H11), 7.54 (m, 2H, H10 and H12), 6.33 (dd, $^3$J=17.6 and 10.8, 1H, H3), 5.15 (d, $^3$J=17.6 Hz, 1H, H4), 5.03 (d, $^3$J=10.8 Hz, 1H, H4), 5.00 (s, 1H, H1), 4.92 (s, 1H, H1), 4.78 (t, J=6.3 Hz, 1H, NH), 2.96 (vq, J=6.7 Hz, 2H, H7), 2.20 (td, $^3$J=7.7 Hz, 2H, H5), 1.65 (vquint, J=8.0 Hz, 2H, H6).

$^{13}$C-NMR (101 MHz, CD$_2$Cl$_2$): δ=145.8 (C2), 140.6 (C8), 138.9 (C3), 133.2 (C11), 129.7 (C9 and C13), 127.5 (C10 and C12), 116.6 (C1), 113.9 (C4), 43.6 (C7), 28.8 (C5), 28.6 (C6).

Example 10

In this example, the copolymerization of 1,3 butadiene with the monomer of formula IX is illustrated. Polymerizations were done to produce three copolymer samples, as indicated in Table 4.

The functional monomer of formula IX was synthesized as described in Example 9.

The monomer of formula IX was added to a flame-dried schlenk-flask as toluene solution (total volume of toluene 15 mL for example 7 and 8, and 35 mL for example 9) and the flask was subsequently sealed with a rubber septum. Butadiene was added by saturation of the toluene at the reaction temperature with 1.05 bar BD pressure. The polymerization was initiated by adding the catalyst in toluene (5 mL) at the indicated reaction temperature. The polymerization was allowed to run at that temperature for the indicated time. 0.5 mL of $NEt_3$ were added to end the polymerization. Residual butadiene was carefully removed under reduced pressure and the polymer was precipitated in MeOH in the presence of BHT (ca. 100 mg/100 mL). The formed polymer was dried overnight at 50° C. under reduced pressure to give the indicated yield g of poly(butadiene-co-(4-methylene-5-hexenyl)-phenylsulfonic amide). Samples were analyzed with results given in Table 4. Molecular weight Mn and polydispersity (PDI) were measured using GPC in THF vs. polystyrene standards. Glass transition temperature Tg was measured using DSC. The microstructure of the polymer was determined by NMR-analyses ($^1H$ and $^{13}C$).

TABLE 4

| Sample | 7 | 8 | 9 |
|---|---|---|---|
| amount of catalyst[1], μmol | 10 | 10 + 10 + 10 + 20 + 20 + 20 | 6 + 6 + 10 |
| temperature, ° C. | r.t. | r.t. | 0 |
| time, h | 0.5 | 24 | 4 |
| butadiene, bar | 1.05 | 1.05 | 1.05 |
| comonomer of formula IX, mmol | 0.2 | 1.2 | 0.43 |
| yield, g | 5.6 | 2.8 | 3.0 |
| comonomer incorporation, mol % | 0.14 | 0.41 | 0.4 |
| comonomer conversion, [%] | 73 | 18 | 50 |
| $M_n$, $10^3$ g/mol | 53 | 21 | 72 |
| PDI | 2.9 | 2.2 | 2.0 |
| $T_g$ ° C. | −94 | −93 | −97 |
| microstructure, %1,4-cis | 96 | 95 | 97 |

[1]Catalyst was added in six aliquots in sample 8 as indicated

What is claimed is:

1. A copolymer of a first monomer selected from the group consisting of 1,3-butadiene and isoprene, and a second monomer of formula I

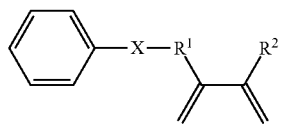

I wherein $R^1$ is a covalent bond, phenylene, a linear or branched alkane diyl group containing 1 to 10 carbon atoms, or a combination of one or more phenylene groups and one or more linear or branched alkane diyl groups containing 1 to 10 carbon atoms; and $R^2$ is hydrogen or a linear or branched alkyl group containing 1 to 10 carbon atoms; and X is a sulfur atom or a structure of formula II or III, wherein when X is of formula III, the S atom of formula III is adjacent to the phenyl ring of formula I and the N atom of formula III is adjacent to R1

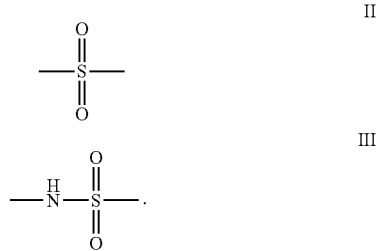

2. The copolymer of claim 1, comprising from 0.1 to 40 percent by weight of units derived from the second monomer of formula I based on the weight of the copolymer.

3. The copolymer of claim 1, comprising from 0.5 to 20 percent by weight of units derived from the second monomer of formula I based on the weight of the copolymer.

4. The copolymer of claim 1, comprising from 1 to 5 percent by weight of units derived from the second monomer of formula I based on the weight of the copolymer.

5. The copolymer of claim 1, wherein the monomer of formula I is selected from the group consisting of the following structures:

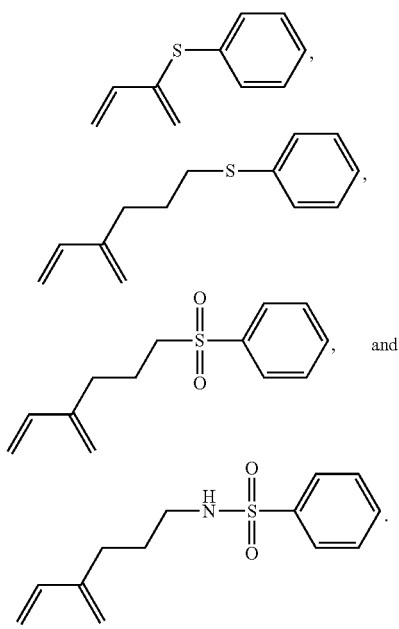

6. A rubber composition comprising the copolymer of claim 1.

7. A pneumatic tire comprising the rubber composition of claim 6.

8. A method of making a copolymer, comprising the step of polymerizing a monomer selected from the group consisting of 1,3-butadiene and isoprene and a monomer of formula I in the presence of an (allyl)(arene)Ni(II) polymerization catalyst

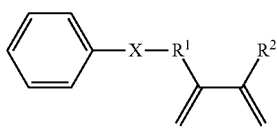
I wherein $R^1$ is a covalent bond, phenylene, a linear or branched alkane diyl group containing 1 to 10 carbon atoms, or a combination of one or more phenylene groups and one or more linear or branched alkane diyl groups containing 1 to 10 carbon atoms; and $R^2$ is hydrogen or a linear or branched alkyl group containing 1 to 10 carbon atoms; and X is a sulfur atom or a structure of formula II or III, wherein when X is of formula III, the S atom of formula III is adjacent to the phenyl ring of formula I and the N atom of formula III is adjacent to R1

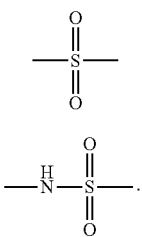

II

III

9. The method of claim 8, wherein the monomer of formula I is selected from the group consisting of the following structures:

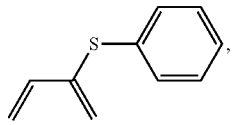

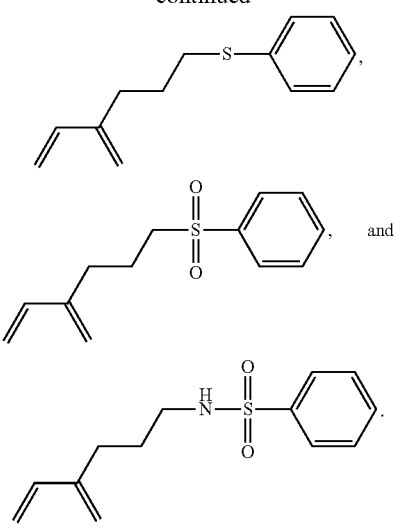

10. The method of claim 8 wherein the polymerization catalyst is of formula IV

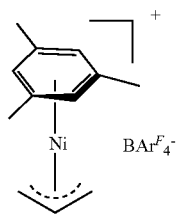

IV where $BAr^F_4{}^-$ is tetrakis(3,5-bis(trifluoromethyl)phenyl)borate.

* * * * *